(12) United States Patent
Kita et al.

(10) Patent No.: US 12,286,378 B2
(45) Date of Patent: Apr. 29, 2025

(54) CONTAINMENT OF PFAS

(71) Applicant: KI STRATEGIES PTY LTD, Parkville (AU)

(72) Inventors: Andrew Kita, Parkville (AU); Grant Scott, Parkville (AU)

(73) Assignee: KI STRATEGIES PTY LTD, Parkville (AU)

( * ) Notice: Subject to any disclaimer, the term of this patent is extended or adjusted under 35 U.S.C. 154(b) by 0 days.

(21) Appl. No.: 18/042,072

(22) PCT Filed: Aug. 23, 2021

(86) PCT No.: PCT/AU2021/050933
§ 371 (c)(1),
(2) Date: Feb. 17, 2023

(87) PCT Pub. No.: WO2022/036414
PCT Pub. Date: Feb. 24, 2022

(65) Prior Publication Data
US 2023/0312421 A1    Oct. 5, 2023

(30) Foreign Application Priority Data

Aug. 21, 2020 (AU) .............................. 2020903004

(51) Int. Cl.
| | |
|---|---|
| *C04B 28/14* | (2006.01) |
| *C04B 14/06* | (2006.01) |
| *C04B 18/14* | (2006.01) |
| *C04B 24/26* | (2006.01) |
| *C04B 28/02* | (2006.01) |
| *C04B 28/04* | (2006.01) |
| *C04B 103/32* | (2006.01) |
| *C04B 103/65* | (2006.01) |
| *C04B 111/00* | (2006.01) |

(52) U.S. Cl.
CPC .............. *C04B 28/14* (2013.01); *C04B 14/06* (2013.01); *C04B 18/146* (2013.01); *C04B 24/2664* (2013.01); *C04B 28/02* (2013.01); *C04B 28/04* (2013.01); *C04B 2103/32* (2013.01); *C04B 2103/65* (2013.01); *C04B 2111/00017* (2013.01); *C04B 2201/50* (2013.01)

(58) Field of Classification Search
CPC ......... C04B 28/14; C04B 28/04; C04B 28/02; C04B 14/06; C04B 18/146; C04B 24/2664; C04B 2111/00017
See application file for complete search history.

(56) References Cited

U.S. PATENT DOCUMENTS

2019/0314876 A1   10/2019  Oberle et al.

FOREIGN PATENT DOCUMENTS

| DE | 102015007292 A1 | * 12/2016 |
|---|---|---|
| WO | 2010065996 A1 | 6/2010 |
| WO | 2017131972 A1 | 8/2017 |
| WO | 2019075518 A1 | 4/2019 |
| WO | 2019113268 A1 | 6/2019 |

OTHER PUBLICATIONS

Al-Aghbari et al. "Stabilisation of Desert Sands Using Cement and Cement Dust", Proceedings of the Institution of Civil Engineers: Ground Improvement, Aug. 2009, pp. 145-151, vol. 162, No. 3.
Baudel et al., "Perfluoroalkyl Substances in a Firefighting Training Ground (FTG), Distribution and Potential Future Release", Journal of Hazardous Materials, Oct. 15, 2015, pp. 46-53, vol. 296.
Consoli et al. "Enhancing Bearing Capacity of Shallow Foundations Through Cement-stabilised Sand Layer Over Weakly Bonded Residual Soil", Geotechnique, Oct. 2022, pp. 872-881, vol. 72, No. 10.
Fehervari et al., "Suitability of Remediated PFAS-Affected Soil in Cement Pastes and Mortars", Sustainability, 2020 pp. 1-19, vol. 12.
Gomes et al. "Permeability of Concrete: A Study for the "in situ" Valuation Using Portable Instruments and Traditional Techniques", Non Destructive Testing in Civil Engineering, 2003.
Naidu et al., "Per- and Poly-Fluoroalkyl Substances (PFAS): Current Status and Research Needs", Environmental Technology & Innovation, Aug. 2020, vol. 19.
Onishi et al. "Strength and Small-strain Modulus of Lightweight Geomaterials: Cement-stabilised Sand Mixed with Compressible Expanded Polystyrene Beads", Geosynthetics International, Dec. 2010, pp. 380-388, vol. 17, No. 6.
SörengÅrd et al., "Stabilization and Solidification Remediation of Soil Contaminated with Poly- and Perfluoroalkyl Substances (PFASs)", Journal of Hazardous Materials, Apr. 5, 2019, pp. 639-646, vol. 367.
Thai et al., "Release of Perfluoroalkyl Substances from AFFF-impacted Concrete in a Firefighting Training Ground (FTG) Under Repeated Rainfall Simulations", Journal of Hazardous Materials Letters, Nov. 2022, vol. 3.
International Search Report and Written Opinion for corresponding International Application No. PCT/AU2021/050933 dated Sep. 30, 2021.
International Preliminary Report on Patentability for corresponding International Application No. PCT/AU2021/050933 dated Aug. 26, 2022, with Annex.

(Continued)

*Primary Examiner* — Robert D Harlan
(74) *Attorney, Agent, or Firm* — Westman, Champlin & Koehler, P.A.

(57) ABSTRACT

The invention provides a method of containing PFAS within a low permeability cementitious product, the method comprising: forming a cementitious slurry, the cementitious slurry comprising: cement; water; aggregate; and allowing the cementitious slurry to cure and thereby form a cementitious product; wherein one or more of the water and the aggregate is contaminated with PFAS; and further wherein the method comprises adding one or more of: siliceous pozzolans; plasticizer(s); and crystalline growth waterproofing compound(s), in an amount sufficient to produce a cementitious product comprising low water permeability, the low water permeability substantially preventing leaching of PFAS.

35 Claims, 5 Drawing Sheets

(56) References Cited

OTHER PUBLICATIONS

Brendel et al. "Short-chain Perfluoroalkyl Acids: Environmental Concerns and a Regulatory Strategy Under REACH", Environmental Sciences Europe, Feb. 27, 2018, 11 pages, vol. 30, No. 1.
Extended Search Report in corresponding European application No. 21857057.0 dated Aug. 26, 2024.
Halvorsen, G. "Applying Penetrating Sealers to Concrete", Publication #C920819, The Aberdeen Group, Concrete Construction Magazine, Nov. 1, 1992, 3 pages.
Toase et al. "A Comparison of Treatment Methods for PFAS Impacted Concrete: Results from Laboratory and Field Trials", International CleanUp Conference, 8th International Contaminated Site Remediation Conference, 2019, 1 page.

* cited by examiner

CONTAINMENT OF PFAS

CROSS-REFERENCE TO RELATED APPLICATION(S)

This Application is a Section 371 National Stage Application of International Application No. PCT/AU2021/050933, filed Aug. 23, 2021 and published as WO 2022/036414 A1, in English, and further claims priority to Australian Application Ser. No, 2020903004, filed Aug. 21, 2020, the contents of which are hereby incorporated by reference in their entirety.

FIELD

The present invention relates to containment of Per- and Polyfluoralkyl Substances ('PFAS') and substances contaminated by PFAS. The present invention additionally relates to a method for containing PFAS within cementitious products to minimize or prevent PFAS leaching.

BACKGROUND

PFAS are a family of chemicals found in a wide variety of consumer and retail products. Thousands of different types of PFAS are known, some being more widely used and understood than others. Many PFAS are resistant to heat, water, grease and oil and have therefore been used in a variety of applications including in stain- and water-resistant fabrics, cleaning products, paints and firefighting foams.

Recent studies suggest that at least some PFAS are bio-accumulative, and that the bio-accumulation of PFAS within humans and animals can have serious adverse health effects, potentially including carcinogenic effects even at relatively low concentrations. Additionally, PFAS can be chemically quite stable as well as soluble, such that PFAS levels in the environment, including in soil and groundwater, can increase over time which in turn increases the risk of health effects, and impact to the environment.

As mentioned above, PFAS have historically been used in aqueous film forming foams (AFFF) used for firefighting. During a fire, such as an inflammable liquid fire, firefighting foams can often be used quite liberally to douse the fire. The result is that following a fire, sites where foams have been used historically can be contaminated with PFAS. Therefore, sites where chemical fires can occur, or have occurred, such as: fire response training facilities, airports, military facilities, fuel refineries and storage facilities, ports, and chemical plants have become quite contaminated over time.

PFAS may leach from such facilities into underlying soil, groundwater, and nearby surface water receptors. Concrete, bitumen, and other commonly used structural materials are porous, and allow PFAS that have previously leached into the matrix of the material to slowly leach out to contaminate the nearby environment. It has further been generally understood that PFAS will leach under alkaline conditions as generally present in cementitious materials.

Further, PFAS are understood to be capable of travel over long distances via surface water, groundwater and other mechanisms such as wind transport of contaminated soils, and will bioaccumulate in food sources such as fish. Given the above, PFAS represent a significant health risk to the community such that PFAS contamination management remains a significant issue. Recent examples of such risks include the town of Katherine, NT, where PFAS contamination from the Tindal RAAF Base has contaminated groundwater and the Katherine River, which the town relies on for its drinking water supply.

To date, the focus of PFAS contamination management has been on clean up/remediation of soils and the water to remove contamination. For example:

PCT Patent Publication WO 2017/131972 A1, in the name of Oxytec LLC, describes a process for the remediation of contaminated soils, ground water and waste. PFAS within the contaminated materials are treated in either in situ or in an ex situ reactor to destroy, breakdown, or defluorinate the contaminating PFAS. The PFAS are treated with a reactant such as: persulphate, oxygen, ozone, hydrogen peroxide or maltodextrin.

PCT Patent Publication WO 2019/113268 A1, in the name of Eminus LLC, effectively describes a froth flotation system for the decontamination of water containing PFAS contaminants. The system comprises introducing a foaming agent to the water, and injecting a gas through a diffuser into the water so as to form bubbles such that the PFAS contaminants accumulate in the bubbles which are then scooped as foam from the surface of the water.

PCT Patent Publication WO 2010/065996, in the name of CRC Care Pty Ltd, discloses a modified clay sorbent which may be used for the sorption of PFAS. According to particular embodiments, the modified clay comprises a palygorskitet clay modified with a cationic surfactant. WO 2010/065996 further discloses a method of separating a contaminant such as PFAS from a contaminated sample by contacting the contaminated sample with the modified clay sorbent.

U.S. Pat. Publication 2019/0314876 A1, in the name of TRS Group Inc, describes a method to remediate soils containing PFAS and organic carbon, in which the soil is heated at a sufficient temperature and for a sufficient duration to reduce surface effects between the organic carbon and the PFAS to permit evaporation of the PFAS.

The above exemplified methods may be considered impractical for larger contamination projects, since the treatments may involve specialist treatment equipment or materials, and/or a significant amount of: effort, reagents, and/or energy to treat or remove the PFAS from material requiring remediation. Additionally, the above exemplified methods do not appear readily suited for the treatment of concrete and like products in which PFAS may continually leach from deep within the cementitious matrix and may not be easily remediated.

DE 2015007292 A1, in the name of SRS Deponiebau GmbH, discloses a method of containing PFAS within a cementitious material. However, this document generally teaches that PFAS will be contained within any cementitious material without any requirement for modification or configuration, which is incorrect. As noted above, PFAS is well known to leach from concrete and like cementitious materials given the porosity and alkaline nature of such materials. DE 2015007292 does teach that additives can be added to the cement binder, including fly ash or pozzolan or lime to optimize the binding behavior or the intended use of the resulting product—however the amount of such additives to include is not specified, nor how the addition of these additives would optimize the binding behavior. In summary, the disclosure of DE 2015007292 A1 may be viewed as entirely speculative and does not provide anywhere near sufficient direction to enable a person skilled in the art to contain PFAS within a cementitious product. Those skilled in the art would recognize, knowing that PFAS generally leaches from concrete and cementitious materials, that the method taught in DE 2015007292 A1 would not actually contain PFAS.

Sörengård, et al., "Stabilization and Solidification Remediation of Soil Contaminated with Poly- and Perfluoroalkyl Substances (PFASs)", *Journal of Hazardous Materials* 367 (2019) 639-646 teaches a method of containing PFAS within a cementitious material. According to the method taught, a sorbent is added to the cementitious product while forming the slurry so as to absorb the PFAS within the sorbent, thereby containing the PFAS within the cementitious material. While the cementitious binder used for experiments, including to produce a control product, included fly ash and granulated blast-furnace base slag, test results showed that cementitious products not including activated carbon or Rembind® did not contain short chain PFAS due to the high-water solubility of those short chain PFAS. Moreover, and as would be understood by those in the art, the addition of sorbents has a negative effect on strength properties of the resultant cementitious material. As a result, Sörengård enables cementitious materials of low compressive strength in the range of 3-5 MPa. More generally, Sörengård teaches toward use of activated carbon-based sorbents to improve the containment of PFAS (specifically short-chain PFAS, which are otherwise not contained) within a cementitious product, notwithstanding the negative effects the addition of this material would be understood to have on resulting mechanical strength.

Fehervari, et al, "Suitability of Remediated PFAS-Affected Soil in Cement Pastes and Mortars" *Sustainability* 12 (2020) 4300 teaches a method of utilizing remediated soil products to produce cementitious building materials. Prior to being included in a cementitious product, PFAS contaminated soil is heat treated at 550-650° C. to remove PFAS to below detection levels. Heat treating of the soil affected its physical and chemical properties, and experimentation was made to ensure the resultant product could be used in the production of cementitious materials. While the soil utilized was originally PFAS contaminated, PFAS is removed to below detection levels before producing the relevant cementitious product. In this way, Fehervari teaches away from a method of containing PFAS within a cementitious product.

Disclosed embodiments of the present invention provide a means for dealing with substances contaminated with PFAS which overcomes one or more of the deficiencies with the existing art, or at least provides a viable alternative.

In certain embodiments, the present invention provides a useful product in addition to a method of dealing with PFAS.

The reference in this specification to any prior publication, or information derived from it, or to any matter which is known, is not, and should not be taken as an acknowledgement or admission or any form of suggestion that the prior publication, or information derived from it, or known matter forms part of the common general knowledge in the field of endeavor to which this specification relates.

SUMMARY

It has now been Unexpectedly found that PFAS may be adequately contained within a cementitious product to prevent or significantly reduce PFAS leaching, according to embodiments of the present invention.

According to a first aspect of the invention, there is provided a method of containing PFAS within a low permeability cementitious product, the method comprising:
  forming a cementitious slurry, the cementitious slurry comprising:
    cement;
    water;
    aggregate; and
  allowing the cementitious slurry to cure and thereby form a cementitious product;
  wherein one or more of the water and the aggregate is contaminated with PFAS, including short-chain PFAS; and
  further wherein the method comprises adding one or more of: siliceous pozzolans; plasticizer(s); or crystalline growth water-proofing compound(s), in an amount sufficient to produce a cementitious product comprising a coefficient of permeability of at or below $10^{-8}$ m/s, thereby substantially preventing leaching of PFAS including short-chain PFAS.

In an embodiment, the aggregate is contaminated with PFAS and the aggregate has not undergone treatment to remove or reduce PFAS contamination.

In an embodiment, the aggregate comprises coarse aggregate.

In an embodiment, the coarse aggregate comprises one or more of: recycled concrete, asphalt, bitumen or gravel.

In an embodiment, the coarse aggregate is contaminated with PFAS.

In an embodiment, the coarse aggregate comprises recycled concrete contaminated with PFAS.

In an embodiment, the aggregate comprises fine aggregate.

In an embodiment, the fine aggregate comprises one or more of; sand, or soil.

In an embodiment, the fine aggregate is contaminated with PFAS.

In an embodiment, the water contains groundwater.

In an embodiment, the water is contaminated with PFAS.

In an embodiment, the method does not comprise the addition of sorbents such as: powdered activated carbon, pulverized zeolite, chitosan, hydrotalcite, and bentonite.

In an embodiment, the cementitious product comprises 2-20% siliceous pozzolans by weight of cement.

In an embodiment, the cementitious product comprises 0.5-5% of plasticizer(s) per 100 kilograms of cement.

In an embodiment, the plasticizer(s) comprises polycarboxylate ether polymer superplasticizer(s).

In an embodiment, the cementitious product comprises 0.25-3% of crystalline waterproofing admixture by weight of cement.

In an embodiment, the cementitious product is high-strength.

In an embodiment, the cementitious product constitutes a stabilized sand product.

In an embodiment, the stabilized sand product comprises approximately: 10-50% cement, 30-60% fine aggregate, and 5-30% water.

In an embodiment, the stabilized sand comprises a compressive strength of at least 6 MPa.

In an embodiment, the cementitious material constitutes a stabilized gravel product.

In an embodiment, the stabilized gravel product comprises approximately: 10-50% cement, 30-60% coarse aggregate, and 5-30% water. In an embodiment, the stabilized gravel product comprises a compressive strength of at least 6 MPa.

In an embodiment, the cementitious product constitutes concrete.

In an embodiment, the concrete comprises approximately: 10-30% cement, 10-30% fine aggregate, 20-60% coarse aggregate, and 5-30% water.

In an embodiment, the concrete comprises a compressive strength of at least 20 MPa.

In an embodiment, the concrete comprises a compressive strength of at least 32 MPa.

In an embodiment, the method comprises casting the cementitious slurry into a precast construction element.

In an embodiment, the cementitious product leaches no more than 20 nanograms of PFAS per liter of water.

In an embodiment, the cementitious product reduces PFAS leaching by at least 70%, when compared to the level of PFAS leaching from the contaminated aggregates, prior to treatment.

In an embodiment, the cement is Portland cement.

In an embodiment, the method further comprises optimizing the composition of the cementitious slurry for a selected purpose, the method comprising:

producing cementitious product samples, the cementitious product samples varying in composition with respect to each other;

performing quantitative property testing on the cementitious product samples, the quantitative property testing including: testing for water penetration and/or water permeability, and testing for PFAS leaching;

selecting a composition of cementitious slurry considered optimum for a desired purpose, such selection based on results of the quantitative property testing; and producing cementitious product using the selected composition of cementitious slurry.

In an embodiment, the method further comprises testing for compressive strength.

According to a second aspect of the invention, there is provided a cementitious product for containing PFAS contamination, the cementitious product produced according to a first aspect of the invention.

In an embodiment, the cementitious product is a concrete product.

In an embodiment, the concrete product is a pre-cast concrete product.

According to a third aspect of the invention, there is provided a method of using a cementitious product according to a second aspect of the invention, wherein the cementitious product used in a civil engineering or construction project.

The present summary is provided only by way of example and not limitation. Other aspects of the present invention will be appreciated in view of the entirety of the present disclosure, including the entire text, claims, and accompanying figures.

Glossary

Throughout this specification and the claims which follow, unless the context requires otherwise:

"comprise" and variations thereof such as "comprises" and "comprising", will be understood to include the inclusion of a stated integer or step or group of integers or steps but not the exclusion of any other integer or step or groups of integers or steps;

all specified percentages relate to wt/wt percentages; and

"plasticizer" includes plasticizers and superplasticizers, and "plasticizers" shall be similarly construed.

DETAILED DESCRIPTION

Figure 1:
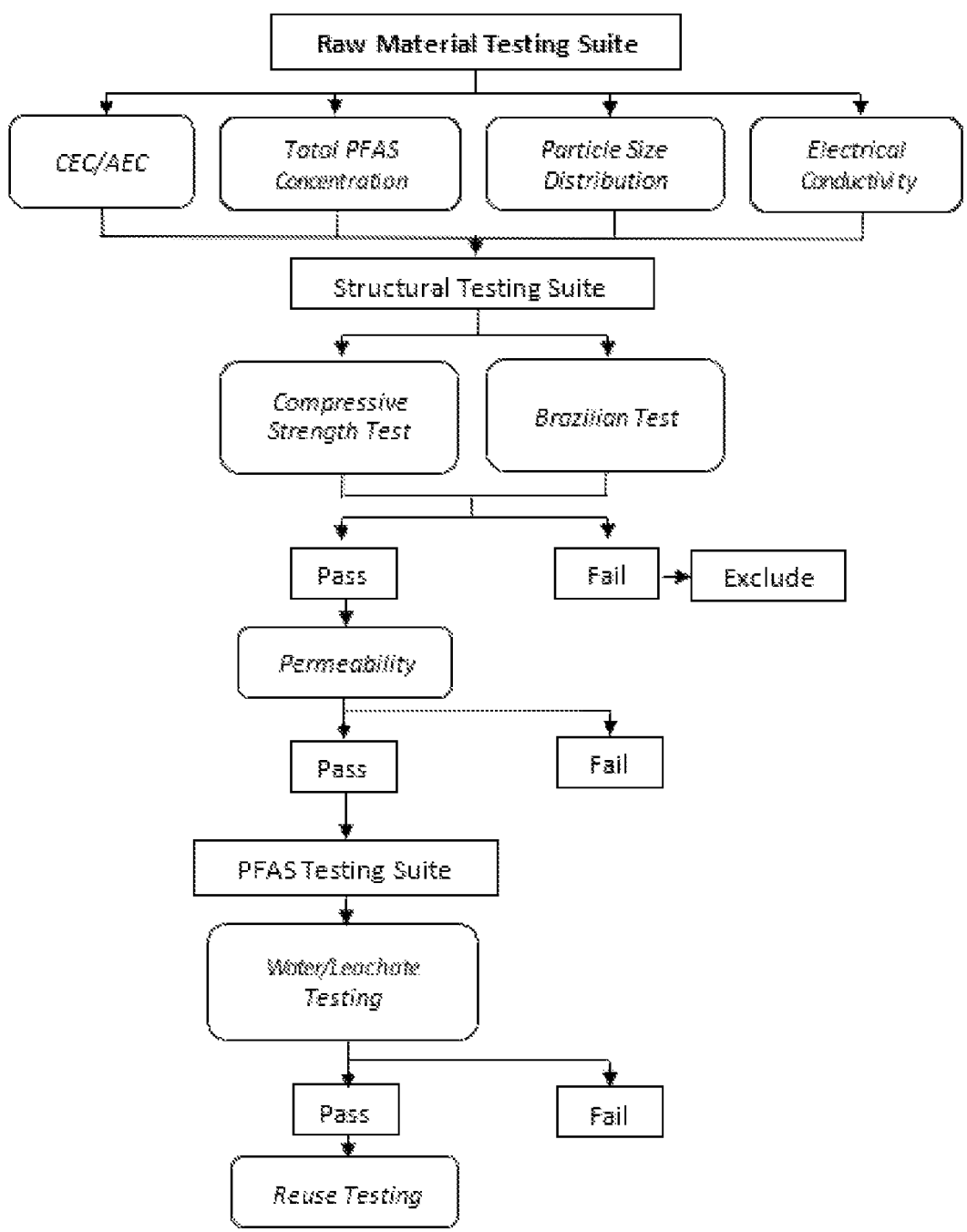
FIG. 1 is a flow chart illustrated an example testing procedure.

It will be convenient to further describe the invention, with reference to the following embodiments. Other embodiments are possible, and consequently, the particularity of the described embodiments is not to be understood as superseding the generality of the preceding description of the invention.

The containment of PFAS within cementitious materials has previously been considered generally infeasible. As inferred above, it has been understood that cementitious materials could not viably contain PFAS due to the high solubility and reduced sorption of PFAS under alkaline conditions (noting that concrete and like products typically have a pH of up to 12-13 upon curing). PFAS have in fact been understood to leach from concrete and like cementitious materials into nearby soils and groundwater over time. Indeed, an issue addressed by particular embodiments of the present invention relates to disposal of pre-existing contaminated concrete and other cementitious products.

It has now been unexpectedly found that PFAS may be adequately contained within a cementitious product in a manner which significantly reduces or prevents PFAS leaching, according to embodiments of the present invention. Such a cementitious product may be a stabilized sand or stabilized gravel product, suitable for on-site or off-site disposal or potentially for use in civil engineering projects. In an alternative embodiment, such a cementitious product may be a concrete product which could also be suitable for landfill disposal but may otherwise be used for production of pre-cast construction elements or poured concrete for use in construction projects.

In an embodiment a cementitious product may be produced from a cementitious slurry comprising a cement (such as Portland cement); an aggregate; water; and additives including one or more of siliceous pozzolans; plasticizer(s); and crystalline growth water-proofing compound(s). It has been found that use of particular additives according to embodiments of the invention can significantly substantially prevent leaching of PFAS, thereby containing the PFAS within the resulting cementitious product.

Without wishing to be bound by theory, it is believed that cementitious compositions according to embodiments of the invention may allow for:

formation of non-soluble crystalline hydration products in the capillary pores of the cementitious product, thereby reducing the permeability to water and ability for water-soluble contaminants such as PFAS, to migrate through the structure;

increased formation of calcium silicate hydrate gel, thereby improving concrete strength and reducing permeability; and the filling of capillary pore/void space to increase density and further reduce permeability and the ability for water-soluble contaminants such as PFAS, to migrate through the cementitious product.

Coarse Aggregate

Where incorporated into the cementitious product according to embodiments of the invention, the coarse aggregate may be selected from suitable materials including natural gravels, crushed rock such as crushed granite, recycled crushed concrete, and combinations of such materials.

According to certain embodiments, the coarse aggregate may comprise materials contaminated with PFAS. For example, in order to contain PFAS that has seeped into an existing concrete product, the existing concrete product may be crushed or otherwise reduced to a coarse aggregate which may then be incorporated into a new cementitious product in order to contain the PFAS according to embodiments of the invention.

According to certain embodiments, the coarse aggregate will not have undergone treatment to remove or reduce PFAS contamination. Contemplated treatments include those background technologies referenced above, e.g. e.g. thermal treatment, chemical treatment or physio-chemical treatment (e.g. absorption technologies).

In addition to potential use in producing concrete products, coarse aggregate may for example be used to produce a stabilized gravel product that could be safely sent to landfill or otherwise used in civil engineering projects.

Fine Aggregate

Where incorporated into the cementitious product, the fine aggregate may be selected from suitable materials including sand, crushed stone, slag, recycled crushed building materials, and combinations of such materials.

According to certain embodiments, the fine aggregate may comprise materials contaminated with PFAS. For example, coarse aggregate could be located from a contaminated site, such as a contaminated landfill or ground nearby to contaminated concrete, e.g. sand or soil adjacent fire response training facilities.

According to certain embodiments, the fine aggregate will not have undergone treatment to remove or reduce PFAS contamination. Contemplated treatments include those background technologies referenced above, e.g. e.g. thermal treatment, chemical treatment or physio-chemical treatment (absorption technology).

In addition to potential use in the production of concrete products, fine aggregate may be used to produce a stabilized sand product that could be sent to landfill or otherwise used in earthworks and civil engineering projects.

Water

Water may be sourced from any suitable location for use in creating cementitious products, and according to certain embodiments be sourced from PFAS-contaminated groundwater, surface water, or other collected water.

Cement

According to certain embodiments, the cement may be formed from Ordinary Portland Cement. In other embodiments, the cement may be formed from other hydraulic or non-hydraulic cements as known to the person skilled in the art, including Portland Pozzolana Cement Rapid Hardening Cement, Extra Rapid Hardening Cement, Low Heat Cement, Sulfates Resisting Cement, Quick Setting Cement, Blast Furnace Slag Cement. Sorel Cement, Slaked Lime, and Geopolymers.

Siliceous Pozzolan(s)

Siliceous pozzolans are materials which when finely divided react with calcium hydroxide in the presence of water to form compounds possessing cementitious qualities. Suitable sources of siliceous pozzolans may be artificial, such as silica fume obtained from silicon smelting, or burned organic matter residues such as rice husk ash. Alternatively, natural sources such as volcanic ashes and pumices may be utilized. According to certain embodiments the siliceous pozzolan is sourced as silica fume.

Without wishing to be bound by theory, it is believed that the addition of siliceous pozzolans strengthens the concrete by reducing the concrete porosity and increasing concrete density, while reducing water mobility within the mixture due to the increased surface area and reduced porosity of the product. Since PFAS impact in a cementitious mixture is typically present within free water (due to solubility) or adsorbed to the contaminated aggregates and in the pore spaces of the concrete matrix, the addition of the siliceous pozzolans assists with reducing water movement, and thus the ability of PFAS substances to leach out of the cementitious product.

Plasticizer(s)

Plasticizers (including superplasticizers) may be utilized according to embodiments of the invention. Suitable plasticizers include polycarboxylates, polysulfonates, lignosulfonates, polyglycol esters, and carbohydrates. More specific examples of suitable superplasticizers include: sulfonated naphthalene formaldehyde condensate, sulfonated melamine formaldehyde condensate, acetone formaldehyde condensate and polycarboxylate ethers. According to certain embodiments, cross-linked melamine- or naphthalene-sulfonates, may be used.

As is known in the art, various forms of plasticizers are available and configured for particular uses. For example, BASF currently distributes polycarboxylate ether superplasticizer under its 'MasterGlenium SKY branding', in which: the '8100' product is configured for producing precast concrete elements; the '8700' product is configured for producing ready mixed concrete in hot weather; the '8703' product is configured to produce a mid-range slump concrete; and the '8708' product is configured to produce concrete for use in 'shotcrete', pumped concrete, applications. Selection of plasticizers may therefore be determined based on the proposed end-use of the cementitious product.

Without wishing to be bound by theory, it is believed that concrete plasticizers exhibit surfactant properties and function as dispersants to minimize particle segregation, assisting with creating a homogeneous concrete/cementitious mixture, and limiting the water requirement of the resultant cementitious product. Additionally, the compressive strength of a resultant concrete increases with the decreasing water to cement ratio.

Crystalline Waterproofing Admixtures

According to certain embodiments of the invention, a crystalline waterproofing admixture may be utilized. Such waterproofing admixtures are commonly utilized to treat existing porous concrete structures and provide a water-resistant barrier. These admixtures work by reacting with unhydrated cement particles within the concrete product to form crystals, thereby filling voids and pores otherwise found in the concrete product. Traditionally, these additives have been used to treat external surfaces of existing porous concrete structures. According to embodiments of the present invention the additive(s) is incorporated into a cementitious slurry prior to curing.

Commercially available examples of crystalline growth waterproofing additives include: 'Contec C1' (understood to be a powdered mixture of quartz, Portland cement, tartaric acid, sodium carbonate, and magnesium hydroxide), 'Xypex concentrate' (understood to be a mixture of Portland cement, silica, calcium carbonate, and calcium aluminates), and 'BASF Masterseal 500' (understood to be a powdered mixture of quartz, Portland cement, calcium carbonate, titanium dioxide, limestone, and gypsum).

Other Components, Additives, Admixtures

It is noted that other additives and components may be incorporated into the cementitious product as appropriate. Other additives which are expressly contemplated include: air entraining admixtures, set retarders, and water reducing, accelerating and shrinkage reducing admixtures. The use of other additives and components determined based on the proposed end-use of the cementitious product, as well as properties of materials including the aggregate used.

Project Work

To confirm the viability of the invention, the current inventors undertook research to provide cementitious products having desirable strength, water penetration and permeability, and PFAS containment properties. In the research performed the fine aggregate consisted of PFAS contaminated sand as further described below.

The general testing procedure utilized is broadly as set out in FIG. 1, such that testing consisted of: initial raw material testing; compressive strength testing; water penetration and permeability testing; and PFAS leachability testing.

Initial Raw Material Testing

In an initial stage, preliminary testing of the raw materials was carried out to confirm that no prior contaminated existed other than that present in the contaminated sand. Also, the contaminated sand was tested to confirm the existence of PFAS. Test results for the contaminated sand were obtained as set out in Table 1 below.

TABLE 1

PPAS content of contaminated sand samples

| Site | Sample ID | PFHxS | PFHpS | PFOS | PFHxA | Sum of PFAS | Sum of PFHxS and PFOS | Sum of PFAS (WA DER List) |
|---|---|---|---|---|---|---|---|---|
| | LOR (mg/kg) | 0.0002 | 0.0002 | 0.0002 | 0.0002 | 0.0002 | 0.0002 | 0.0002 |
| Site B | B1A | <0.0002 | <0.0002 | 0.0007 | <0.0001 | 0.0007 | 0.0007 | 0.0007 |
| | B1-R1 | 0.0011 | <0.0002 | 0.0086 | 0.0002 | 0.0098 | 0.0096 | 0.0098 |
| | B1-R2 | 0.0009 | <0.0002 | 0.0077 | 0.0002 | 0.0088 | 0.0086 | 0.0088 |
| | B1-R3 | 0.0009 | <0.0002 | 0.0078 | 0.0001 | 0.0089 | 0.0088 | 0.0089 |
| | B1B | <0.0002 | <0.0002 | 0.0008 | <0.0002 | 0.0008 | 0.0008 | 0.0008 |
| | B2A | <0.0002 | <0.0002 | 0.0004 | <0.0001 | 0.0004 | 0.0004 | 0.0004 |
| | B2-R1 | <0.0002 | <0.0002 | 0.0008 | 0.0003 | 0.0010 | 0.0008 | 0.0010 |
| | B2-R2 | <0.0002 | <0.0002 | 0.0007 | 0.0002 | 0.0009 | 0.0007 | 0.0009 |
| | B2-R3 | 0.0002 | <0.0002 | 0.0007 | 0.0002 | 0.0011 | 0.0009 | 0.0011 |
| | B2B | <0.0002 | <0.0002 | 0.0005 | <0.0002 | 0.0005 | 0.0005 | 0.0005 |
| | B3-R1 | 0.0010 | 0.2047 | 0.0215 | 0.0003 | 0.2276 | 0.0225 | 0.0229 |
| | B3-R2 | 0.0010 | 0.2074 | 0.0214 | 0.0003 | 0.2301 | 0.0224 | 0.0227 |
| | B3-R3 | 0.0009 | <0.0002 | 0.0188 | 0.0003 | 0.0200 | 0.0197 | 0.0200 |
| | B3-R4 | 0.0010 | 0.2171 | 0.0222 | 0.0003 | 0.2407 | 0.0233 | 0.0236 |
| 95% UCL | | 0.0011 | 0.1020 | 0.0186 | 0.0003 | 0.1670 | 0.0196 | 0.0196 |

The results shown in Table 1 indicate that the PFAS content of the contaminated sands was sufficiently high to be considered 'contaminated' according to applicable standards, thereby requiring remediation or other treatment to manage potential risks to environmental and/or human receptors.

As shown in FIG. 1, other testing was performed on ingredient components of the cementitious products during the project to test for correlations, relationships and other effects in the resulting products. Such other testing included cation/anion exchange capacity testing, particle size distribution testing, and electrical conductivity. This further testing did not demonstrate any relevant correlations or effects in respect of the resulting cementitious products. As such no further elaboration on those tests is provided herein.

Slurry Composition

Once the preliminary testing of the raw materials was complete, cementitious slurries were produced having compositions as set out in:

Table 2, which unless otherwise specified describes the slurries by volumetric ratios (i.e. parts), and Table 3, which describes the same slurries as Table 2 in quantitative amounts added.

Tables 2 and 3 refer to use of admixtures A, B, and C, in which:

Admixture A is a crystalline waterproofing admixture comprising: Portland cement, calcium hydroxide, calcium aluminates, silica sand and alkaline earth compounds.

Admixture B is another crystalline waterproofing admixture comprising: Portland cement, 2,3-dihydroxylbutanedioic acid, sodium carbonate, limestone, gypsum, titanium dioxide and quartz.

Admixture C comprises amorphous, reactive pozzolan, silica fume; and a polycarboxylate ether polymer superplasticizer.

To achieve uniform mixing with minimal cross contamination, slurries were created using a 2-mixer system. The first mixer was used for all non-PFAS contaminated materials prior to transfer to the second mixer where PFAS contaminated sands were included. Mixers were washed thoroughly with tap water between the production of each triplicate monolith set.

TABLE 2

| Product | Cement | Sand | Aggregate | Additive | Water |
|---|---|---|---|---|---|
| Mix by volume | | | | | |
| Product A | | | | | |
| Stabilized Sand | 1 part | 3 parts | — | 1.5% | 0.5 parts |
| Stabilized Base | 1 part | — | 3 parts | 1.5% | 0.5 parts |
| 20 MPa Concrete | 1 part | 2.5 parts | 5 parts | 1.5% | 0.75 parts |
| 32 MPa Concrete | 1 part | 2.5 parts | 4 parts | 1.5% | 0.66 parts |
| 40 MPa Concrete | 1 part | 1 part | 2 parts | 1.5% | 0.5 parts |
| Product B | | | | | |
| Stabilized Sand | 1 part | 3 parts | — | 2% | 0.5 parts |
| Stabilized Base | 1 part | — | 3 parts | 2% | 0.5 parts |
| 20 MPa Concrete | 1 part | 2.5 parts | 5 parts | 2% | 0.75 parts |
| 32 MPa Concrete | 1 part | 2.5 parts | 4 parts | 2% | 0.66 parts |
| 40 MPa Concrete | 1 part | 1 part | 2 parts | 2% | 0.5 parts |
| Product C (ratio 84% silica fume/16% superplasticizer) | | | | | |
| Stabilized Sand | 1 part | 3 parts | — | 8%/(1.5 L/100 kg) | 0.5 |
| Stabilized Base | 1 part | — | 3 parts | 8%/(1.5 L/100 kg) | 0.5 |
| 20 MPa Concrete | 1 part | 2.5 parts | 5 parts | 8%/(1.5 L/100 kg) | 0.75 |

TABLE 2-continued

| | Mix by volume | | | | |
|---|---|---|---|---|---|
| Product | Cement | Sand | Aggregate | Additive | Water |
| 32 MPa Concrete | 1 part | 2.5 parts | 4 parts | 8%/(1.5 L/100 kg) | 0.66 |
| 40 MPa Concrete | 1 part | 1 part | 2 parts | 8%/(1.5 L/100 kg) | 0.5 |

TABLE 3

| | Mix by approx. amounts | | | | |
|---|---|---|---|---|---|
| Product | Cement (kg) | Additive (kg) | Sand (kg) | Aggreg. (kg) | Water (L) |
| Product A | | | | | |
| Stabilized Sand | 40 | 0.6 | 53 | 0 | 20 |
| Stabilized Base | 40 | 0.6 | 0 | 53 | 20 |
| 20 MPa Concrete | 20 | 0.3 | 22 | 44 | 15 |
| 32 MPa Concrete | 20 | 0.3 | 22 | 36 | 13 |
| 40 MPa Concrete | 40 | 0.6 | 18 | 36 | 20 |
| Product B | | | | | |
| Stabilized Sand | 40 | 0.8 | 53 | 0 | 20 |
| Stabilized Base | 40 | 0.8 | 0 | 53 | 20 |
| 20 MPa Concrete | 20 | 0.4 | 22 | 44 | 15 |
| 32 MPa Concrete | 20 | 0.4 | 22 | 36 | 13 |
| 40 MPa Concrete | 40 | 0.8 | 18 | 36 | 20 |
| Product C (ratio 84% silica fume/16% superplasticizer) | | | | | |
| Stabilized Sand | 40 | 3.2/0.6 | 53 | 0 | 20 |
| Stabilized Base | 40 | 3.2/0.6 | 0 | 53 | 20 |
| 20 MPa Concrete | 20 | 1.6/0.3 | 22 | 44 | 15 |
| 32 MPa Concrete | 20 | 1.6/0.3 | 22 | 36 | 13 |
| 40 MPa Concrete | 40 | 3.2/0.6 | 18 | 36 | 20 |

Compressive Strength Testing

To obtain compressive strength test results, slurries according to each of the above compositions were cast in cylindrical molds of 100 mm diameter and 200 mm length. Slurry was poured into each of the molds (ungreased) in layers, with each layer compacted by stirring to remove air voids. Following pouring, the molds were held above 90% relative humidity at a temperature of 27°±2° C. for 24 hours. After this period, the cast specimens were submerged in freshwater for 7 days or 28 days respectively. At least three cast specimens were produced for each slurry composition and curing period.

Figure 2A:
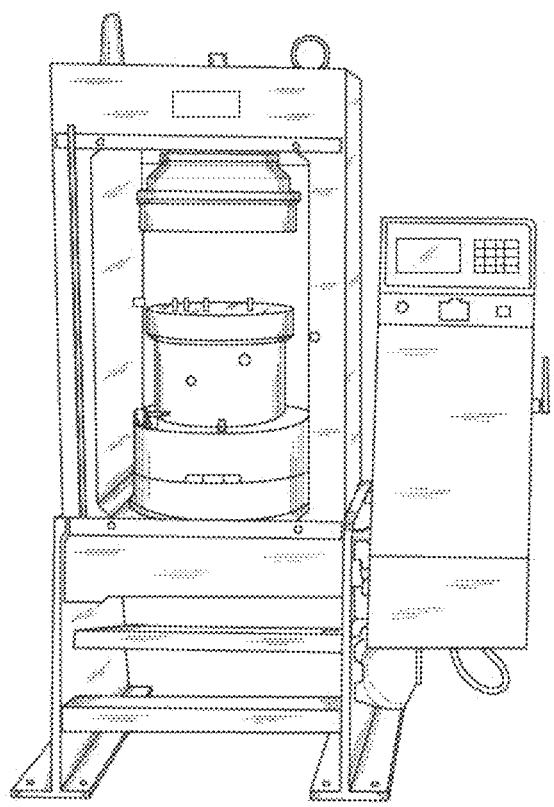
FIG. 2A is a perspective view of an example compression-testing machine.
Figure 2B:
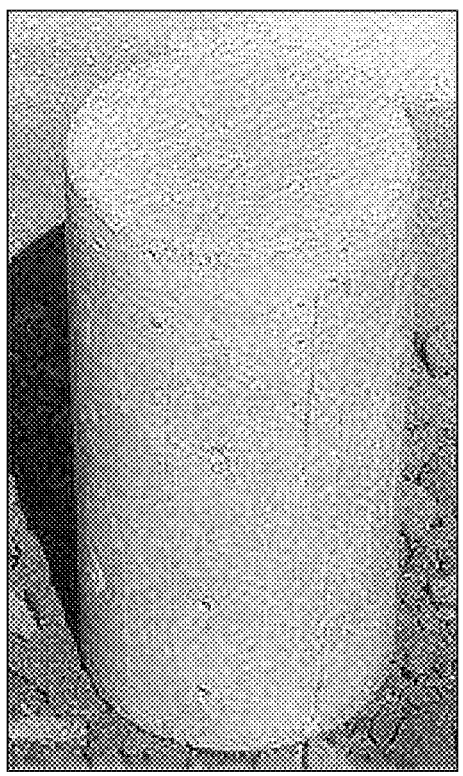
FIG. 2B is a perspective view of a cured concrete test cylinder, shown pre-testing.
Figure 2C:
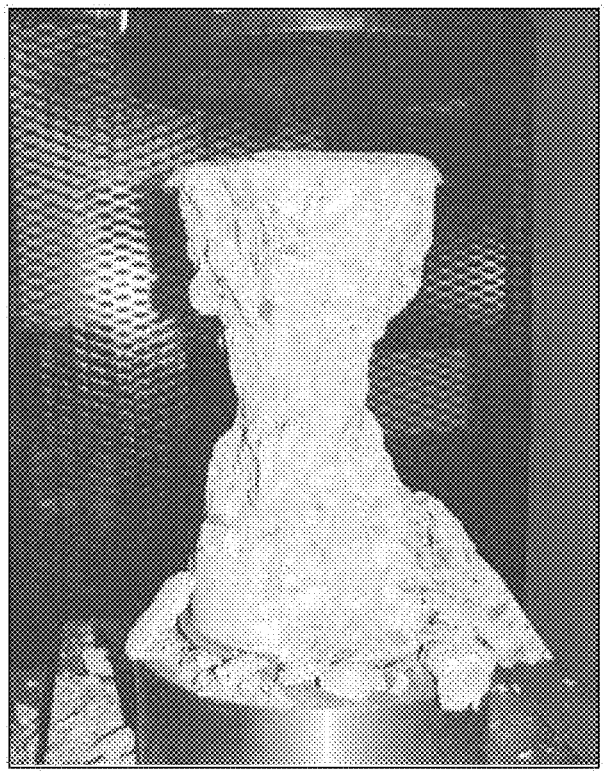
FIG. 2C is a perspective view of a test cylinder, post-testing, that failed during testing.

The compressive strength of the cured concrete casts was tested on a 'Manual Digital Type DHR 2000 compression-testing machine, as exemplified in FIG. 2A. The testing procedure for each cast specimen was as follows:
- the specimen was taken out of the freshwater and wiped down to remove excess water (a pre-test cylinder is exemplified in FIG. 2B);
- the specimen was placed vertically on the platform of the compression testing machine. Uniform load application and distribution was facilitated by having pad caps at the ends of the cylinders;
- before the load was applied, it was made sure that the loading platforms touched the top of the cylinder;
- the load was then applied continuously and uniformly without shock at the rate of 2.62 kN/min. This was continued until the specimen failed (as exemplified in FIG. 2C);
- the maximum load taken was then recorded; and
- the test was repeated for the remaining two specimens of a given slurry composition.

As noted above, a minimum of 3 specimens were tested for each slurry composition. The diameters of the cast cylinders were measured in 2 locations perpendicular to each other at the mid-height of the cylinder. The average of these values was taken to calculate the cross-sectional area, if the diameter measured differed more than 2%, the cylinder was not tested.

The resulting compressive strength of samples in respect of stabilized sand and 32 MPa concrete is set out in Table 4 below:

TABLE 4

| Compressive strength testing | | | | | | | |
|---|---|---|---|---|---|---|---|
| | | Mix | | | | | |
| | | Stabilized Sand | | | | | |
| | | Additive | | | | | |
| | | Product A | | Product B | | Product C | |
| Compressive Strength | | Sample Name | | | | | |
| Testing | Units | SS/A/1 | SS/A/2 | SS/B/1 | SS/B/2 | SS/C/1 | SS/C/2 |
| CST | MPa | 32.6 | 18.3 | 28.3 | 26.4 | 29.2 | 38.9 |
| CST (Av-MPa) | MPa | 24.425 | | 27.333 | | 33.703 | |
| CST (STD) | | 3.575 | | 0.475 | | 2.425 | |
| CST (% STD/AVE) | | 14.637 | | 1.738 | | 7.195 | |

TABLE 4-continued

| | | Compressive strength testing | | | | | |
|---|---|---|---|---|---|---|---|
| | | Mix 32MPA Concrete Additive | | | | | |
| | | Product A | | Product B | | Product C | |
| | | Sample Name | | | | | |
| Compressive Strength Testing | Units | 32MPA/ A/1 | 32MPA/ A/2 | 32MPA/ B/1 | 32MPA/ B/2 | 32MPA/ C/1 | 32MPA/ C/2 |
| CST | MPa | 26.6 | 26.1 | 28.3 | 26.8 | 30.9 | 45.8 |
| CST (Av-MPa) | MPa | 26.349 | | 27.540 | | 37.619 | |
| CST (STD) | | 0.125 | | 0.375 | | 3.725 | |
| CST (% STD/AVE) | | 0.474 | | 1.362 | | 9.902 | |

The results of Table 4 demonstrate that cementitious products having reasonable strength characteristics for various uses, including products suitable for use in civil engineering and construction, may be produced from compositions incorporating PFAS contaminated components. The results for Product C demonstrated higher compressive results than for Products A and B in relation to the specific components tests including the contaminated sand as tested).

In other embodiments, the strength characteristics of the cementitious product may be less relevant in comparison to other product characteristics, such as where the cementitious product is intended to be sent to landfill.

As shown in FIG. 1, the Brazilian test could be performed in addition or as an alternative to the compressive strength testing described. In the discussed project, the inventors did not perform any Brazilian tests.

Penetration and Permeability Testing

To obtain permeability and penetration results, concrete slurries again according to each of the above compositions were cast in cylindrical molds of 80 mm diameter and 160 mm length, in a manner otherwise corresponding to that described in respect of compressive strength testing. Following pouring, the cast specimens were held above 90% relative humidity at a temperature of 27°±2° C. for 24 hours and then submerged in freshwater for 30 days.

Figure 3A:
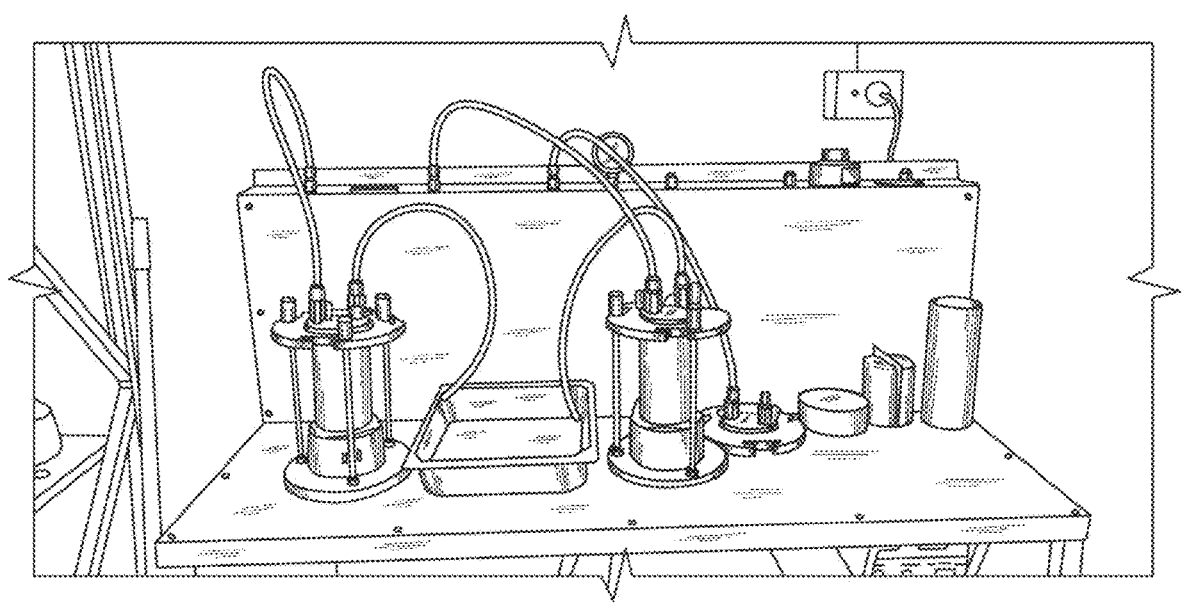
FIG. 3A is a perspective view of an example permeameter.

To test permeability, a permeameter was developed incorporating a non-corrodible permeameter rig having an internal diameter of 80 mm and an internal effective height of 220 mm. Following insertion of a concrete sample into the rig, detachable end plates were at each end to enable transfer of pressurized water. The utilized permeameter is shown in FIG. 3, which demonstrates simultaneous testing of two rigs.

Figure 3B:
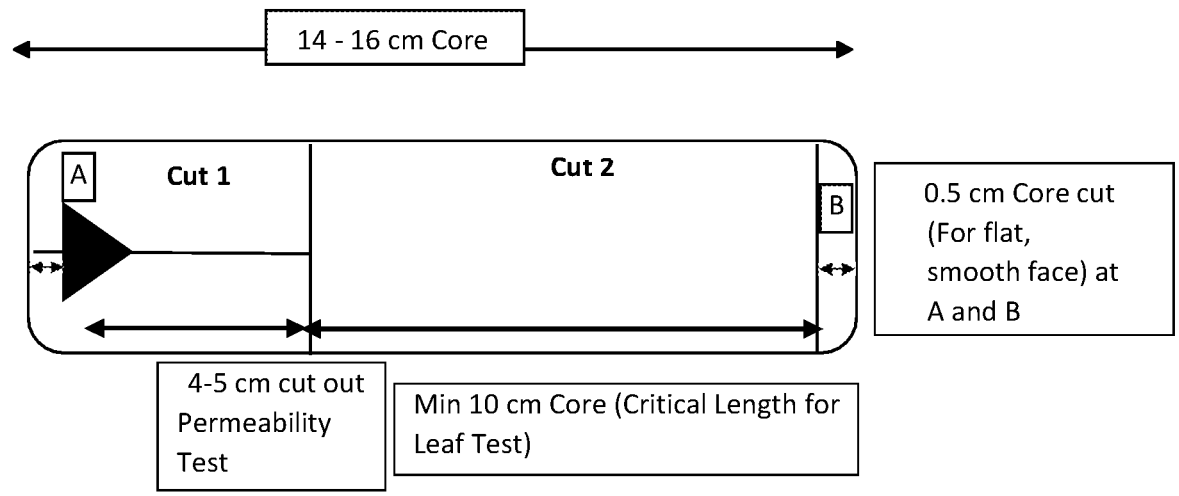
FIG. 3B is a schematic illustration of how a cast test sample cylinder can be cut into sub cores.
Figure 4A:
FIGS. 4A and 4B are perspective views of measurement of water penetration in a test sample core.
Figure 4B:

The following steps were then taken to test permeability in respect of each cast specimen:
- 0.5 cm of material were cut off each end of the cast specimen, to provide a flat face and remove any smooth/slippery finish from the core surface, and allow the cores to be inserted evenly in the geo-con rig;
- the cut specimen was wet and paper dried;
- the length (L) and weight (Wi) of the cut specimen was recorded;
- the core was inserted in the geo-con rig under 200 kPa, air was bled out of the water pipes, and the cores were left in place for one hour (60 mins);
- the cores were removed from rig after one hour, wetted and paper dried, and subsequently weighed. The weight (Wf) was then recorded;
- the cores were cut into 2 sub cores as shown in FIG. 3B to provide:
  - 'cut 1'—a 4-5 cm cut which was used for the Permeability Test measurements; and
  - 'cut 2'—a minimum of 10 cm (Critical Length) which was used for the Leaf Test;

The water penetration in the core surface was marked out using a 'texta' and the penetration value was taken as the deepest point of penetration to account for the worst-case scenario. The penetration was then measured using a ruler, as shown in FIG. 4B. Results of the testing are set out in Table 5 below.

The Coefficient of Permeability for the constant head test was then calculated using the equation $$k = \frac{QL}{hAt},$$

where Q ($cm^3$) is discharge, A ($cm^2$) is the cross sectional area of the rig, L (cm) is the length of the core sample, and h (kPa) is the head difference between the inlet and the outlet.

TABLE 5

| Penetration and permeability test results | | | | |
|---|---|---|---|---|
| Mix | Admix | Penetration (AV-cm) | Penetration (STD) | Penetration (% STD/AVE) |
| Stabilized Sand | A | 2.71 | 0.15 | 5.63 |
| | B | 2.49 | 0.37 | 14.90 |
| | C | 2.35 | 0.54 | 22.94 |
| 32 MPA | A | 3.81 | 0.19 | 4.93 |
| | B | 4.24 | 0.13 | 2.95 |
| | C | 1.55 | 0.35 | 22.59 |
| Mix | Admix | Coefficient of Permeability (AV-cm) | Coefficient of Permeability (STD) | Coefficient of Permeability (% STD/AVE) |
| Stabilized Sand | A | 7.54E−09 | 3.65E−09 | 48.41 |
| | B | 9.09E−09 | 1.03E−09 | 11.32 |
| | C | 5.86E−09 | 4.52E−09 | 77.03 |
| 32 MPA | A | 6.38E−09 | 1.98E−09 | 31.08 |
| | B | 1.20E−08 | 3.16E−09 | 26.33 |
| | C | 3.25E−09 | 1.06E−09 | 32.65 |

The results demonstrated cementitious products having low permeability and penetration. As may be expected, water penetration was generally shown to have a direct relationship with permeability (i.e. low water penetration typically meant low water permeability). Compositions comprising additive C demonstrated lower levels of penetration and permeability for both stabilized sand and 32 MPA concrete when compared with compositions comprising additive A or additive B.

Leachability Testing

Based on permeability testing it was determined that water did not generally permeate or exit tested samples. This meant that leachate data could not be obtained from penetration and permeability test results. The inventors therefore progressed to leachability testing using a LEAF test method.

LEAF testing adhered to the US EPA's LEAF Test guideline Method 1315—Mass Transfer Rates in Monolithic and Compacted Granular Materials Using a Leaching Tank Procedure, and was conducted in a PFAS-free environment.

Eighteen (18) concrete samples produced as part of the permeability testing were measured to be 80 mm×100 mm. The samples were placed in PFAS-free high-density polypropylene (HDPE) 5-liter storage containers. Storage container lids were cut off to allow placement of the monolith without obstruction.

All storage containers and sampling bottles were initially rinsed with LCMS Grade Methanol (>99.9%) and rinsed twice with Ultrapure Milli-Q water, Gloves were replaced during the handling of each monolith. All sampling bottles were labelled post sampling to ensure the impact of PFAS in labelling was minimal.

The following steps were repeated in during test:
2.50 L±16.00 L of Ultrapure Milli-Q water was measured and added to the 5-liter storage container containing monolith;
three (3) blanks containing no monolith were prepared and were treated identically throughout the entire testing regime;
monoliths were stored in storage containers with water and covered with cut off lids for a period of time allowing for decreasing testing frequency over the course of the project;
future testing regimes were conducted by sampling water in the storage container in 100 mL, HDPE sample bottles;
remaining water was discarded;
monolith and storage containers were dried and mass was measured of the cumulative materials;
storage containers and monoliths were refilled with 2.5 L of Ultrapure Milli-Q water and covered with lids until the next testing regime; and
water samples collected were submitted for PFAS analysis.

In certain circumstances, a testing regime may be completed over, for example, over a 12-month period such that testing involves:
four (4) testing regimes conducted with a period of 3-day intervals initially;
two (2) testing regimes conducted with a period of 7-day intervals, after 3-day tests;
four (4) testing regimes conducted with a period of 30-day intervals post 7-day tests;
and
one (1) testing regime conducted with a period of 6-month intervals after all 30-day tests During the project presently described, tests were conducted over an initial three week period, noting that the largest amount of leaching may be expected to occur initially. The results of collated testing following after the three week period is shown in Table 6 (showing results for each of admixtures A. B, and C).

TABLE 6

PFAS leachability testing results

| Mix | Admix | PFBA | PFPeA | PFBS | PFHxA | PFPeS | PFHpA | PFHxS | PFHpS |
|---|---|---|---|---|---|---|---|---|---|
| Stabilized Sand | A | <20 | <20 | <20 | <20 | <20 | <20 | <20 | <20 |
|  | B | <20 | <20 | <20 | <20 | <20 | <20 | <20 | <20 |
|  | C | <20 | <20 | <20 | <20 | <20 | <20 | <20 | <20 |
| 32MPA | A | <20 | <20 | <20 | <20 | <20 | <20 | <20 | <20 |
|  | B | <20 | <20 | <20 | <20 | <20 | <20 | <20 | <20 |
|  | C | <20 | <20 | <20 | <20 | <20 | <20 | <20 | <20 |

| Mix | Admix | PFOA | PFOS | PFNA | PFDA | PFUdA | PFDoA | PFTrDA | PFTeDA |
|---|---|---|---|---|---|---|---|---|---|
| Stabilized Sand | A | <20 | <20 | <20 | <20 | <20 | <20 | <20 | <20 |
|  | B | <20 | <20 | <20 | <20 | <20 | <20 | <20 | <20 |
|  | C | <20 | <20 | <20 | <20 | <20 | <20 | <20 | <20 |
| 32MPA | A | <20 | <20 | <20 | <20 | <20 | <20 | <20 | <20 |
|  | B | <20 | <20 | <20 | <20 | <20 | <20 | <20 | <20 |
|  | C | <20 | <20 | <20 | <20 | <20 | <20 | <20 | <20 |

As set out in Table 6, all PFAS concentrations were below limit of reporting (20 ng/L), and did not exceed relevant guidelines. Detectable concentrations of PFAS initially located within contaminated sand were considered contained in the concrete cores. For the purposes of this project undertaken by the inventors, PFAS was considered to poses no risk of leaching from the cementitious product samples. Given the low levels of penetration, permeability and leaching, it is to be expected that embodiments of the invention will assist in containing various PFAS-materials, including PFAS contaminated water and PFAS contaminated soil, gravel, rock, asphalt or concrete.

The inventors carried out further testing of cementitious products whereby concrete products were broken down into smaller particles, and those particles were also tested for PFAS leaching, to evaluate the performance of PFAS containment within the product should surface area increase by means of cracking, or intentional demolition of the product in the future. The inventors found that the broken-down concrete particles continued to contain PFAS with minimal if any PFAS leaching.

The results of the project demonstrate that cementitious products such as stabilized sand and concrete can be produced from PFAS contaminated materials in a manner which contains the PFAS, including according to this and other embodiments short-chain PFAS, within the cementitious product. Further, the cementitious materials according to certain embodiments may possess physical properties such as compressive strength which renders them suitable for use in civil engineering and construction projects. In this way, a useful construction material may be produced from what may otherwise be seen as a contaminated waste product.

Due to the inherently variable nature of contaminated materials (e.g. sands, gravels, concrete, asphalt, etc.) and site contamination (e.g. PFAS concentrations measured on one site to another), the ideal formulation to yield a particular result (i.e. particular physical strength characteristics, permeability and penetration, etc.) may vary from site to site and materials used. Nevertheless, utilizing compositions according to the present invention and testing methodologies as taught above, suitable results which include environmentally acceptable containment of PFAS can be achieved without undue experimentation.

It will be understood to persons skilled in the art of the invention that modifications may be made without departing from the spirit and scope of the invention. The embodiments and/or examples as described herein are therefore to be considered as illustrative and not restrictive.

The invention claimed is:

1. A method of containing PFAS within a low permeability cementitious product, the method comprising:
forming a cementitious slurry, the cementitious slurry comprising:
cement;
water;
aggregate; and
allowing the cementitious slurry to cure and thereby form a cementitious product;
wherein one or more of the water and the aggregate is contaminated with PFAS, including short-chain PFAS; and
further wherein the method comprises adding one or more of: siliceous pozzolans, plasticizer(s), or crystalline growth water-proofing compound(s), in an amount sufficient to produce a cementitious product comprising a coefficient of permeability of at or below $10^{-8}$ m/s, thereby substantially preventing leaching of PFAS, including short-chain PFAS.

2. The method according to claim 1, wherein the aggregate is contaminated with PFAS and the aggregate has not undergone treatment to remove or reduce PFAS contamination.

3. The method according to claim 1, wherein the aggregate comprises coarse aggregate.

4. The method according to claim 3, wherein the coarse aggregate comprises one or more of: recycled concrete, asphalt, bitumen, or gravel.

5. The method according to claim 3, wherein the coarse aggregate is contaminated with PFAS.

6. The method according to claim 1, wherein the aggregate comprises fine aggregate.

7. The method according to claim 6, wherein the fine aggregate comprises one or more of: sand, or soil.

8. The method according to claim 6, wherein the fine aggregate is contaminated with PFAS.

9. The method according to claim 1, wherein the water contains groundwater.

10. The method according to claim 1, wherein the water is contaminated with PFAS.

11. The method according to claim 1, wherein the cementitious product comprises 2-20% siliceous pozzolans by weight of cement.

12. The method according to claim 1, wherein the cementitious product comprises 0.5-5 liters of plasticizer(s) per 100 kilograms of cement.

13. The method according to claim 12, wherein the plasticizer(s) comprise a polycarboxylate ether polymer superplasticizer(s).

14. The method according to claim 1, wherein the cementitious product comprises a compressive strength of at least 20 MPa.

15. The method according to claim 1, wherein the cementitious product comprises 0.25-3% of crystalline waterproofing agent by weight of cement.

16. The method according to claim 1, wherein the cementitious product constitutes a stabilized sand product.

17. The method according to claim 16, wherein the stabilized sand product comprises 10-50% cement; 30-60% fine aggregate, and 5-30% water, by weight.

18. The method according to claim 16, wherein the stabilized sand product comprises a compressive strength of at least 6 MPa.

19. The method according to claim 1, wherein the cementitious material constitutes a stabilized gravel product.

20. The method according to claim 19, wherein the stabilized gravel product comprises 10-50% cement, 30-60% coarse aggregate, and 5-30% water, by weight.

21. The method according to claim 19, wherein the stabilized gravel product comprises a compressive strength of at least 6 MPa.

22. The method according to claim 1, wherein the cementitious product constitutes concrete.

23. The method according to claim 22, wherein the concrete comprises approximately: 10-30% cement, 10-30% fine aggregate, 20-60% coarse aggregate, and 5-30% water, by weight.

24. The method according to claim 22, wherein the concrete comprises a compressive strength of at least 20 MPa.

25. The method according to claim 22, wherein the concrete comprises a compressive strength of at least 32 MPa.

26. The method according to claim 1, wherein the method comprises casting the cementitious slurry into a precast construction element.

27. The method according to claim 1, wherein the cementitious product leaches no more than 20 mg of PFAS per L of water.

28. The method according to claim 1, wherein the cementitious product reduces PFAS leaching by at least 70%, when compared to the level of PFAS leaching from the contaminated aggregates, prior to treatment.

29. The method according to claim 1, wherein the cement is Portland cement.

30. A method according to claim 1, further comprising optimizing the composition of the cementitious slurry for a selected purpose by further:
producing cementitious product samples, the cementitious product samples varying in composition with respect to each other;
performing quantitative property testing on the cementitious product samples, the quantitative property testing including: testing for compressive strength, testing for water penetration and/or water permeability, and testing for PFAS leaching;
selecting a composition of cementitious slurry considered optimum for a desired purpose, such selection based on results of the quantitative property testing; and producing cementitious product using the selected composition of cementitious slurry.

31. A cementitious product for containing PFAS contamination, the cementitious product produced according the method of claim 1.

32. The cementitious product according to claim 31, wherein the cementitious product is a concrete product.

33. The cementitious product according to claim 32, wherein the concrete product is a pre-cast concrete product.

34. The method according to claim 1 and further comprising:
using a cementitious product produced according to claim 1, in a civil engineering or construction project.

35. The method according to claim 1, wherein the method comprises adding one or more of: siliceous pozzolans, plasticizer(s), or crystalline growth water-proofing compound(s), in an amount sufficient to produce a cementitious product comprising a coefficient of permeability of at or below $10^{-10}$ m/s.

* * * * *